(12) United States Patent
Cooper et al.

(10) Patent No.: US 6,782,372 B1
(45) Date of Patent: Aug. 24, 2004

(54) LATENT EFFECTS DECISION ANALYSIS

(75) Inventors: J. Arlin Cooper, Albuquerque, NM (US); Paul W. Werner, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 569 days.

(21) Appl. No.: 09/675,900

(22) Filed: Sep. 28, 2000

(51) Int. Cl.$^7$ ............................................. G06F 15/18
(52) U.S. Cl. ............................. 706/8; 706/2; 706/52; 706/48
(58) Field of Search .................... 706/48, 45, 60, 706/50, 919, 911, 925, 2, 7, 6, 5, 23, 8, 52, 47; 705/7

(56) References Cited

U.S. PATENT DOCUMENTS

| | | | | |
|---|---|---|---|---|
| 5,014,220 A | * | 5/1991 | McMann et al. | 706/45 |
| 5,682,309 A | * | 10/1997 | Bartusiak et al. | 700/29 |
| 5,754,738 A | * | 5/1998 | Saucedo et al. | 706/11 |
| 5,774,121 A | * | 6/1998 | Stiegler | 345/769 |
| 5,963,447 A | * | 10/1999 | Kohn et al. | 700/49 |
| 5,999,923 A | * | 12/1999 | Kowalski et al. | 706/47 |
| 6,088,689 A | * | 7/2000 | Kohn et al. | 706/10 |
| 6,172,966 B1 | * | 1/2001 | Taillibert et al. | 370/252 |
| 6,397,202 B1 | * | 5/2002 | Higgins et al. | 706/47 |
| 6,611,735 B1 | * | 8/2003 | Henly et al. | 700/266 |
| 2001/0053991 A1 | * | 12/2001 | Bonabeau | 705/7 |
| 2002/0165837 A1 | * | 11/2002 | Zhang et al. | 706/16 |
| 2003/0115175 A1 | * | 6/2003 | Baatz et al. | 707/1 |

FOREIGN PATENT DOCUMENTS

JP 406096055 A * 4/1994 ........... G06F/15/20

OTHER PUBLICATIONS

Evans et al., "Multicriteria Optimization of Simulation Models", Proceedings of the 1991 Winter Simulation Conference, pp. 894–900, 1991.*
Cooper, J.A., "Non–Traditional Performance Analysis", Proceedings of the 2nd International Conference on Intelligent Processing and manufacturing of Materials, vol. 1, pp. 191–194, Jul. 1999.*
O'Rorke, P., "Qualitative Decision Analysis: Comparing Alternative Approaches", NEC Research Index, Oct. 1995.*
Slagle et al., "An Expert System for a Resource Allocation Problem", Communications of the ACM, vol. 28, No. 9, Sep. 1985.*

(List continued on next page.)

*Primary Examiner*—Anil Khatri
*Assistant Examiner*—Kelvin Booker
(74) *Attorney, Agent, or Firm*—George H Libman

(57) ABSTRACT

Latent effects on a system are broken down into components ranging from those far removed in time from the system under study (latent) to those which closely effect changes in the system. Each component is provided with weighted inputs either by a user or from outputs of other components. A non-linear mathematical process known as 'soft aggregation' is performed on the inputs to each component to provide information relating to the component. This information is combined in decreasing order of latency to the system to provide a quantifiable measure of an attribute of a system (e.g., safety) or to test hypotheses (e.g., for forensic deduction or decisions about various system design options).

14 Claims, 10 Drawing Sheets

OTHER PUBLICATIONS

Stanley et al., "A Cost–Benefit Decision Model: Analysis, Comparison, and Selection of Data Management Systems", ACM Transactions n Database Systems, vol. 12, No. 3, pp. 472–520, Sep. 1987.*

Cooper et al., "Improved Safety Analysis Through Enhanced Mathematical Structures", 1997 IEEE International Conference on Systems, Man, and Cybernetics, vol. 2, pp. 1656–1661, Oct. 1997.*

Cooper, J.A., "The Application of Fuzzy Mathematics in Safety Analysis*", Proceedings of the 5th IEEE International Conferenc on Fuzzy Systems, vol. 2, pp. 1002–1006, Sep. 1996.*

Cooper et al., "The Application of New Mathematical Structures to Safety Analysis", The 1998 IEEE International Conference o Fuzzy Systems Proceedings, vol. 1, pp. 692–697, May 1998.*

Covan et al., "Predictable Safety in the Control of High Consequence Systems", 3rd IEEE International Conference on High–Assurance Systems Engineering Symposium, pp. 200–204, Nov. 1998.*

Cheng et al., "Generation of High Quality Non–Robust Tests for Path Delay Faults", 31st ACM/IEEE Design Automation Conference, 1994, pp. 365–369.*

Chillarege et al., "The Effect of System Workload on Error Latency: An Experimental Study", 1985, pp. 69–77.*

* cited by examiner

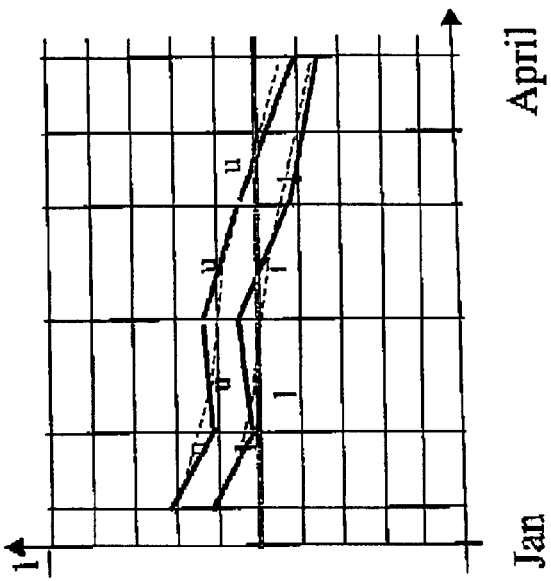

A1 (Aircraft Preparation) = high no. of aircraft incidents, or low ramp maintenance scores, or low cargo loading scores

Figure 15A

Aircraft preparation was a problem throughout the period, although it improved some in February.

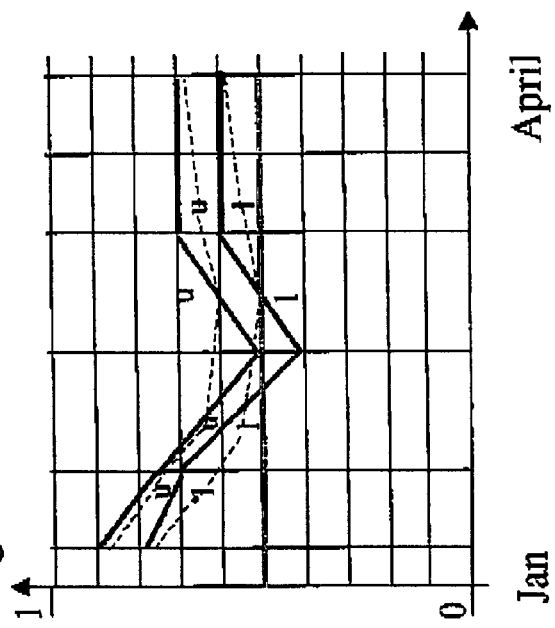

A2 (Management Influence) = low management culture and low compliance scores, or low management personnel scores

Figure 15B

Management influence was an early concern, but improved toward the end of the period.

LATENT EFFECTS DECISION ANALYSIS

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

It is conventional in decision analysis to weigh a variety of diverse factors and combine these factors either directly or through proportional logic to derive metrics. For example, a student's grade may be based 20% on homework scores, 10% on class participation, 10% on classroom behavior, and 60% on test scores. Such a grade would be $$G = \sum_i^4 w_i x_i$$

where $w_i$=the individual weights; $x_i$=the individual grades; and $$\sum_i^n w_i = 1.$$

This linear analysis has been used for many years in education and many other fields; however, it and other known analysis systems may not be satisfactory for weighing factors that are uncertain and which do not combine linearly or independently. Surety analysis and the associated decision analysis for such conventional systems are basically applicable to only experience-measurable or physical-model-derived data. However, most practical analyses, including high-consequence system surety analysis, must also utilize subjectivity.

It is a challenging task to systematically (preferably mathematically) assess subjective factors such as organizational factors as to their effects on system operation. Furthermore, these are generally latent factors that influence critical system operation over time. For instance, if a grade is supposed to measure the student's knowledge in a subject, other factors relating to the school, the teacher, the administration, and the student's home life also have an effect on the student's knowledge, but these factors are not accounted for in the traditional system.

There has been considerable prior effort on analytically incorporating engineering judgment into analysis systems. For example, Dempster-Shafer theory establishes a framework in which frequentist probability and Bayesian incorporation of new data are subsets. Although these methodologies both allow judgment, neither derives results that can explicitly indicate the relative amounts of subjective judgment and measurable data in the results.

For example, the safety status of an airline operation might depend on measuring factors such as the implications of accident/incident statistics, maintenance personnel/pilot competence and experience, scheduling pressures, and the safety "culture" of the organization. Many of the potential metrics on such parameters are difficult (and generally uncertain) to determine. A top-down analytical approach requires more than individual parameter assessment which is used in some conventional tabular schemes. Furthermore, aggregation of the parameters into an overall metric requires a methodology that can account for nonlinearities and dependence. Twice as many attributes is unlikely to be twice as beneficial, and scheduling pressures could influence accident/incident statistics.

SUMMARY OF THE INVENTION

It is an object of this invention is to provide a new risk management decision-aid methodology.

It is also an object of this invention to aggregate data that are inputs (both objective and subjective) to each subsystem by a "soft aggregation" process.

It is a further object to track uncertainty whereby inputs may be entered with uncertainty measures and output uncertainty may be correspondingly determined.

It is another object to provide a technique to account for dependence between or among inputs (which is by far the most common case as opposed to independent inputs).

It is also an object of the invention to account for "importance" (contribution of each input to the output value(s)) and "sensitivity" (potential for improvement in the output due to each input(s)).

And it is an object of the invention to be able to determine "trends" for each input and output over time.

It is also an object of this invention to display inputs as they are entered, outputs as they are aggregated for overall contribution or "early alerts," in a manner that is unusually natural for humans to understand and work with (instrumentation-like displays portrayed on a computer screen)

To achieve the foregoing and other objects, and in accordance with the purpose of the present invention, as embodied and broadly described herein, the present invention may comprise a method of nonlinear decision analysis, comprising providing a plurality of inputs having either positive or negative values, and determining an output representative of a decision as a function of the inputs, where the output approaches a first value asymptotically as the value of positive inputs increases, and approaches a second value asymptotically as the value of negative inputs increases. The invention further includes instrumentation-like gage displays (giving a human-friendly interface and display of uncertainty range) for displaying inputs and outputs, an architecture of subsystem modules that are interconnected to reflect latent effects, and a "soft aggregation" combination of input data to reflect nonlinear accumulation of effects.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

FIGS. 15A and 15B shows the results of two early alerts in Example 2.

DETAILED DESCRIPTION OF THE INVENTION

This invention considers latent effects on a system that is broken down into components ranging from those far removed in time from the system under study (latent) to those which closely effect changes in the system. Each component is provided with weighted inputs either by a user or from outputs of other components. A mathematical process known as 'soft aggregation' is performed on the inputs to each component to provide information relating to the component. This information is combined in decreasing order of latency to the system to provide a quantifiable measure of an attribute of a system (e.g., safety) or to test hypotheses (e.g., for forensic deduction or decisions about various system design options). Unlike the simple linear system discussed above, where only those components which closely effect change are considered, in this invention the most remote components are examined with soft aggregation first, and their effects on the system are provided as added inputs for more relevant components. The process is repeated until the components which closely effect change are analyzed. Lastly, uncertainties in the data input into and received from the system are both accounted for and displayed.

System Decomposition

Figure 1:
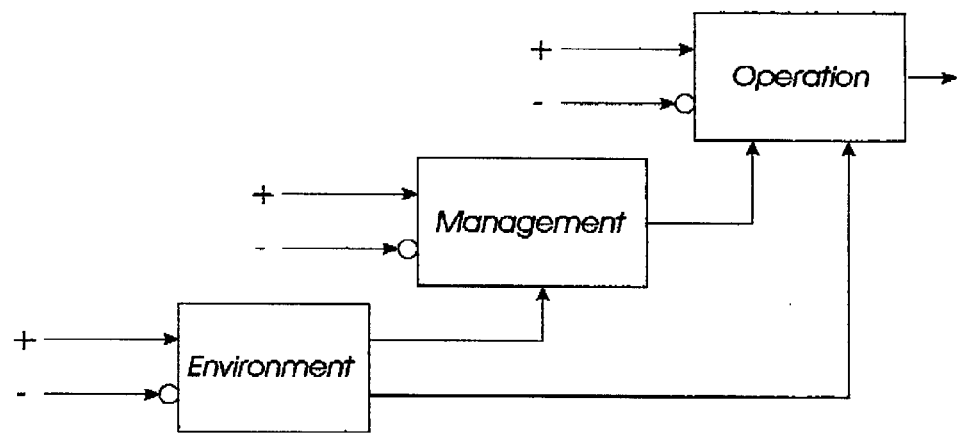
FIG. 1 shows latent effects breakdown of a generic system.

The application of this invention to a system requires the system to be broken into components in an order dependent upon the time a change in the component has an effect on the output of the system. FIG. 1 shows the evaluation of a generic system according to the latent effects model of this invention.

For almost all systems, the most latent effects occur with changes in environment, a term which may include outside factors which effect the system, such as the rules imposed by law or custom on the system, the competition, the economic climate, and the like. Changes in these factors may have major effect on the system, but they typically take the most time to work through a system. The environment component of the system is represented by a box in FIG. 1. All components may have weighted positive (indicated by a +) and negative (indicated by a −) user-supplied inputs, with a circle indicating a negative input.

The next most latent effects occur with changes in management. Every system is managed by people who make rules and policies, allocate assets, and take other steps which, although removed from the day-to-day work, effect such work over time. The management component is indicated by a box which has a weighted input from the environment box as well as the user-supplied inputs referenced above.

The most immediate effects arise from the operation of the system, where things are done. These are the only factors considered by typical analysis systems, such as grade and homework scores in the education example previously discussed. The operations component is indicated by a box that has both weight environment and management inputs, as well as user-supplied inputs. The output of the operation component is the property being evaluated.

The analysis of each component is by 'soft aggregation', as described hereinafter. The weights are provided by the user and reflect the user's best estimate of how each input can effect the system. The weights may be adjusted to get known data to correlate with a known output.

Applying the education example to this model, if the desired output is a measure of the school's ability to teach a subject to a student, the operation inputs could be the traditional inputs of scores, homework, and class participation; while the management inputs could be teacher experience, time to devote to the subject; and class size (a negative input); while the environment inputs could be school funding, economic condition of the neighborhood, and the like.

Furthermore, additional components may be utilized, and each may be further broken down into a plurality of subcomponents for an actual implementation of the invention.

EXAMPLE 1

Latent Effects

For analysis of an airline safety program, the effects of component breakdown could be identified as operation, implementation, management, and environment. For a system such as an air carrier, the environment includes business conditions (competition, financial atmosphere, and regulations) as well as the physical environments in which employees work and aircraft fly. As a rule, the elements in this category are those which are imposed upon the institution being evaluated. Next, a management structure (organization, responsibilities, policies) is built within the environment. Implementation takes place within the management structure, which includes carrying out basic responsibilities,(e.g., design, analysis, procurement, decision-making). Then operation, the ultimate objective, takes place (e.g., maintenance, air transportation of goods and personnel).

Figure 2:
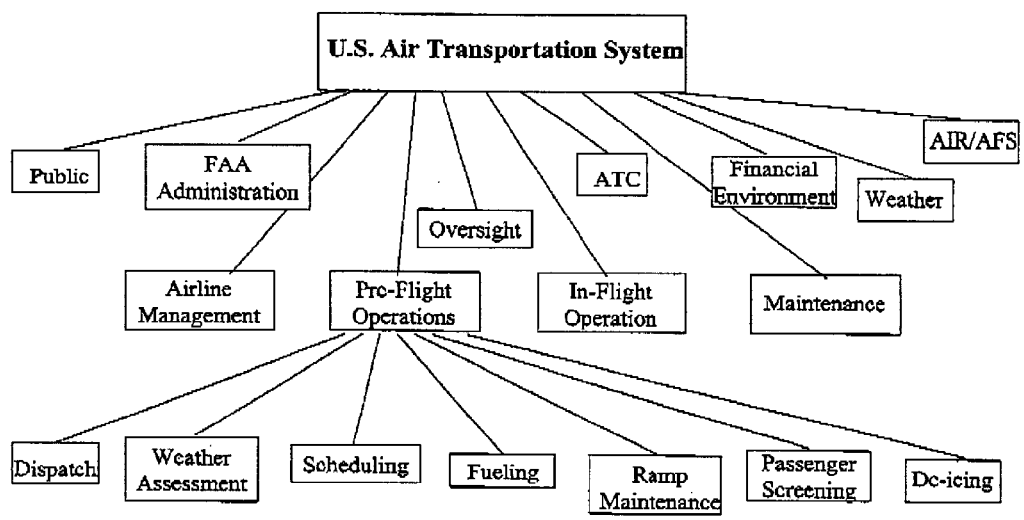
FIG. 2 shows an illustrative decomposition of the U.S. Air Transportation System.

As shown in FIG. 2, the U.S. Air Transportation System may be decomposed into 11 subsystems, of which the four in the middle of the figure are appropriate constituents of the Air Transportation Oversight System process. (These are the constituents which an airline can control.) One of these (Pre-Flight Operations) is shown further decomposed, and this process can be applied to all four of these components until an arbitrary level of usefulness is obtained. No interactions between the subsystems are indicated at this point. The environment is not included, since it is not directly affected by the oversight system.

Figure 3:
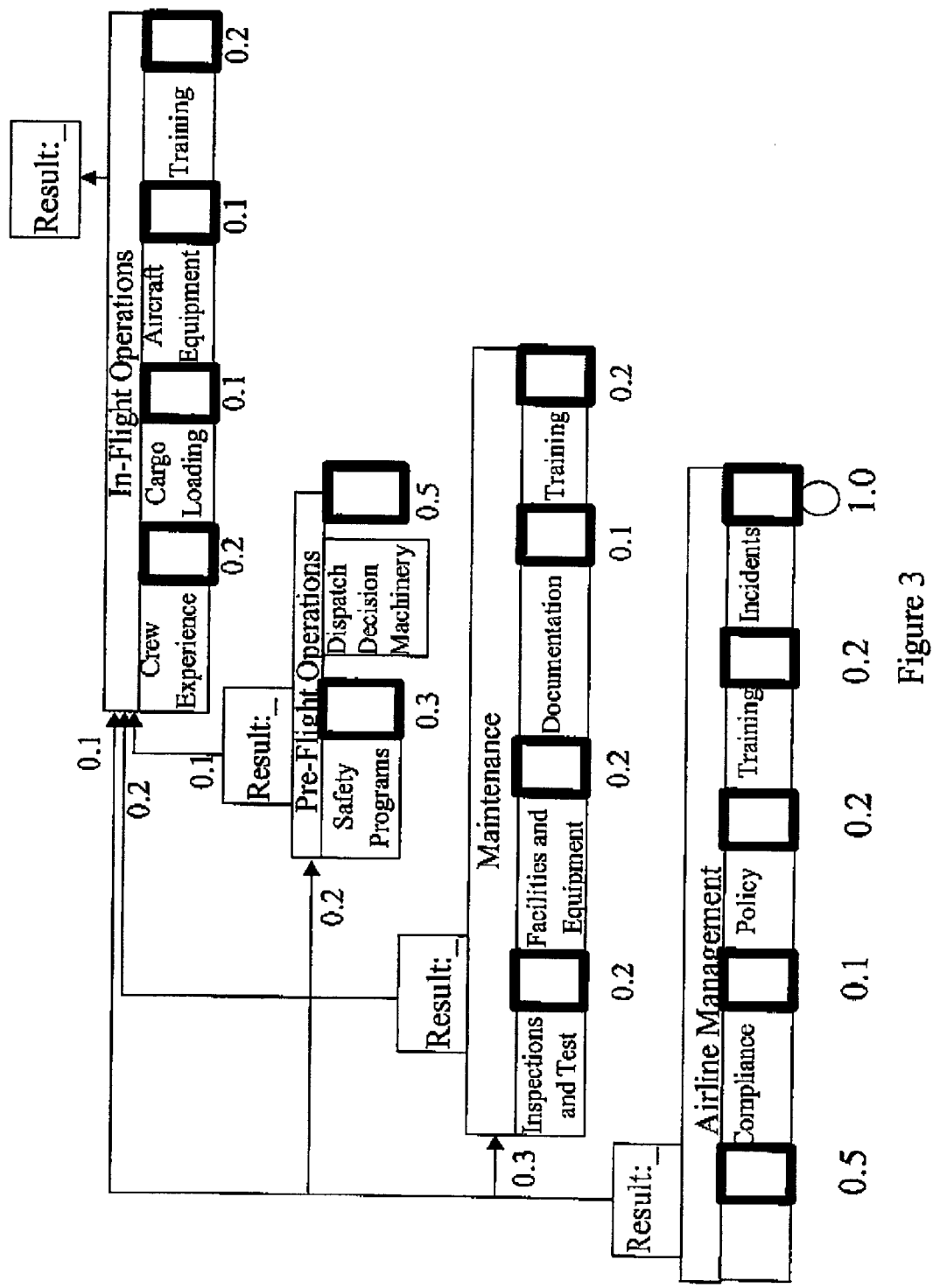
FIG. 3 shows a second-level latent effects model

In FIG. 3, the four chosen constituents are portrayed in a latent effects structure. Note that however important the top-down influences may be to the overall system safety, immediate criticality is also indicated by relative placement of the constituents from one edge (bottom) to an opposing edge (top) in latent effects diagrams. In order to capture both the importance of early influences and the immediate criticality of later influences, latent effects modeling for the oversight activity is portrayed generally from lower left to upper right, where time generally increases from left to right and immediate criticality generally increases from bottom to top. The structure shown in FIG. 3 is termed a "second-level" latent effects structure, because it is one step decomposed beyond the top (first) level (no decomposition).

Each of the four subsystems has associated inputs for user entry, which are indicated by the 15 open boxes. Inputs data values can range from low (zero) to high (one), where the higher values contribute more to safety, except for boxes with an attached circle—for these, lower values contribute more to safety. This is intended to be consistent with the implication of the names associated with the inputs. The weights necessary for the soft aggregation process are shown in the figure associated with each input. Each box uses these inputs and weights to solve the soft aggregation equation.

Although considerable care was taken in selecting the subsystems, the interconnections, the inputs, and the weights, it is expected that users who are familiar with the airline system would make their own choices as they become familiar with using the latent effects tool. Furthermore, if there is a body of historical data for a system, it may be applied to a latent effects model according to this invention, and the weights then adjusted to get an output that corresponds with known performance.

Figure 4:
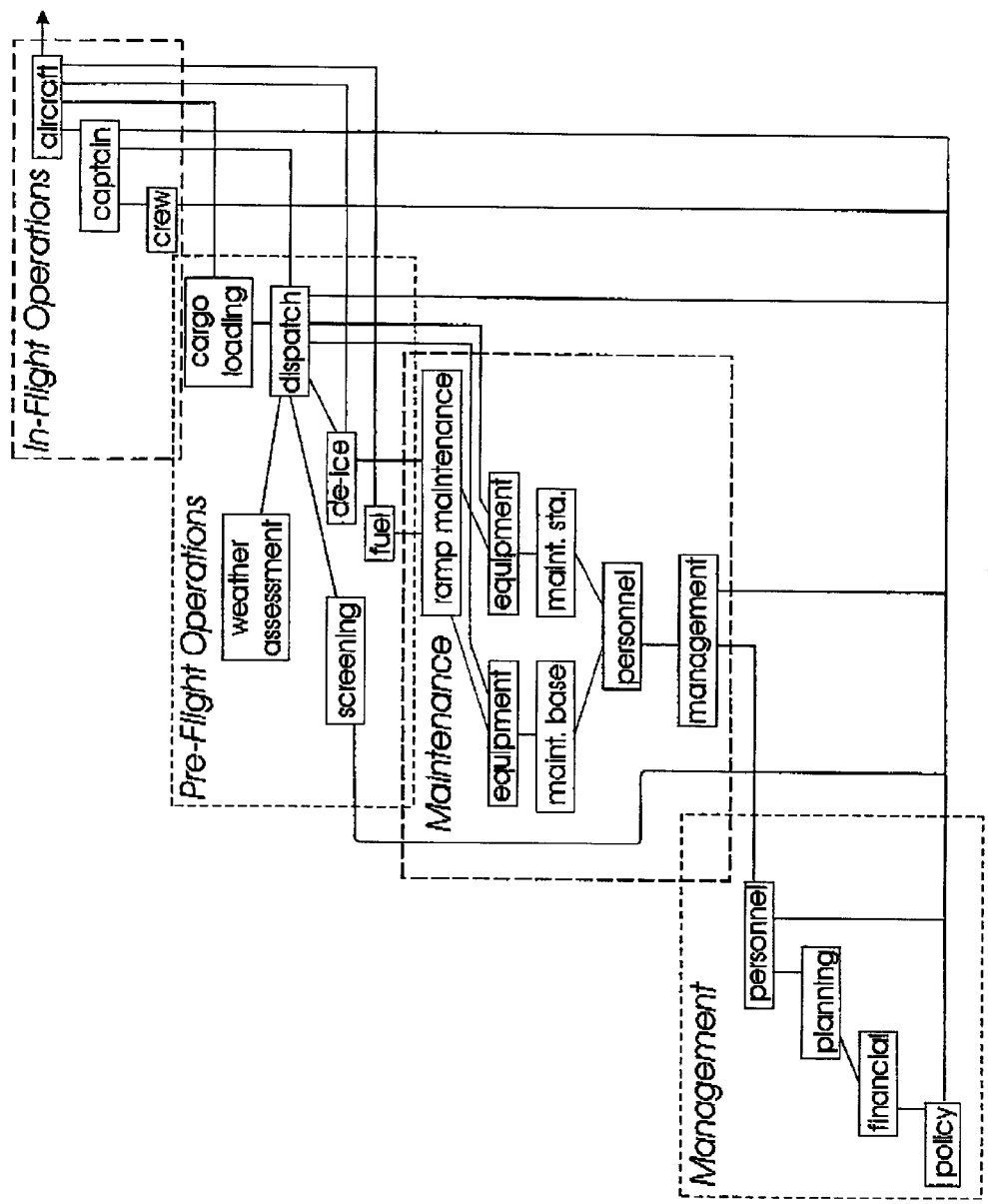
FIG. 4 shows third-level latent effects decomposition architecture

The third level architecture shown in FIG. 4 involves further decomposition of the second level system of FIG. 3 into 20 subsystems and 45 inputs. This is expected to be the most useful level for a comprehensive assessment function use. While more detailed decompositions could be made, the user would begin to lose sight of the top-down view, and preventing this loss of perspective is a paramount objective of the latent effects invention. The four dashed rectangles (corresponding to the four level-two boxes) indicate regions for which a more detailed view can be selected, and through which inputs can be entered in a software implementation.

Figure 5:
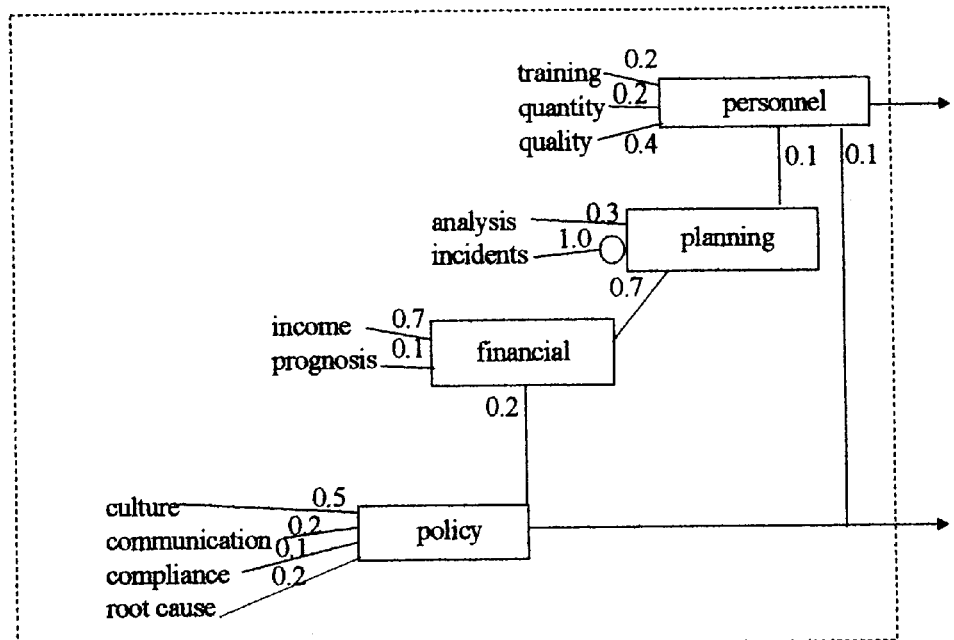
FIG. 5 show a management subsystem of the system of FIG. 4.

FIGS. 5–8 provide the input and weight details for each of these regions. FIG. 5 shows the Management region and its 11 available inputs. The multiple outputs indicate that the intermediate results are used in various other parts of the system. Similarly, the Maintenance view selection in FIG. 6 enables entry of 14 additional inputs, the Pre-Flight Operations view in FIG. 7 enables the entry of 12 additional inputs, and the In-Flight operations view in FIG. 8 enables the entry of the final eight inputs for this example application.

Soft Aggregation

An important aspect of the invention is analysis of the different components of a system utilizing a mathematical process that this invention calls "soft aggregation", which utilizes a nonlinear accumulation of information (e.g., doubling or tripling input values results in less than double or triple output effects) that can asymptotically approach an upper or lower limit. Soft aggregation overcomes the pretense that knowledge about a system or organization can ever be complete, and obviates the need to keep accumulating measurements past the point of diminishing returns.

The defining criteria of soft aggregation is that input values are combined in such a way that positive inputs move the output towards the value "1", and, negative inputs move the output towards the value "0" (assuming there was at least one positive value), but each of these values is only approached in an asymptotic manner For the simple grade example above, the analysis was completed using the linear relationship of equation 1. For soft aggregation of the invention, the analysis reflects a gradual accumulation of information that is never complete, but which can reach a useful state of knowledge before a point of impractical further pursuit is reached. One way to do this (but certainly not the only way) is to use a double exponential function, as illustrated in equation 2:

$$f = [1 - a^{-f(q)}] \cdot b^{-f(r)} \qquad 2$$

where a and b are constants, $f(q)$ is a function of one of the positive negative inputs, and $f(r)$ is a function of the other of the positive or negative inputs.

An embodiment of equation 2 that has been utilized in the practice of the invention is shown in equation 3:

$$f = \left[1 - e^{-\sum_{i=1}^{n} k_g w_i x_i}\right] e^{-\sum_{j=1}^{m} k_b v_j y_j} \qquad 3$$

The $w_i$ and $v_j$ indicate "weights" on the significance of the n "positive" and m "negative" factors being examined (positive factors tend to increase the score, such as 'training'; negative factors reduce the score, such as 'classroom disruptions'). The weights are normalized so that $$\sum_{i=1}^{n} w_i = 1 \text{ and } \sum_{j=1}^{m} v_j = 1.$$

The $x_i$ and $y_j$ are the scores for the factor attributes on a scale of 0 to 1. The constants $k_g$ and $k_b$ are variables that controls how fast positive and negative information accumulates. The values of each k is generally dependent on the number of aggregate constituents.

It should be apparent that if inputs to a component are 'perfectly positive'; i.e., the sum of the wx=1 and the sum of vy=0, then $f=1-e^{-k}$, or $f \to 1$ as the value of k increases. Conversely, if the inputs are 'perfectly bad', then $f=0$. In addition, equation 3 has about a ten times greater impact for each negative factor than for positive factors. This impact could be equalized by making $k_g$ greater than $k_b$, but experience has shown that users tend to overestimate the positive factors when describing a system. Furthermore, they usually list many more positive factors than negative factors, so the ultimate result is quite accurate.

Figure 9:
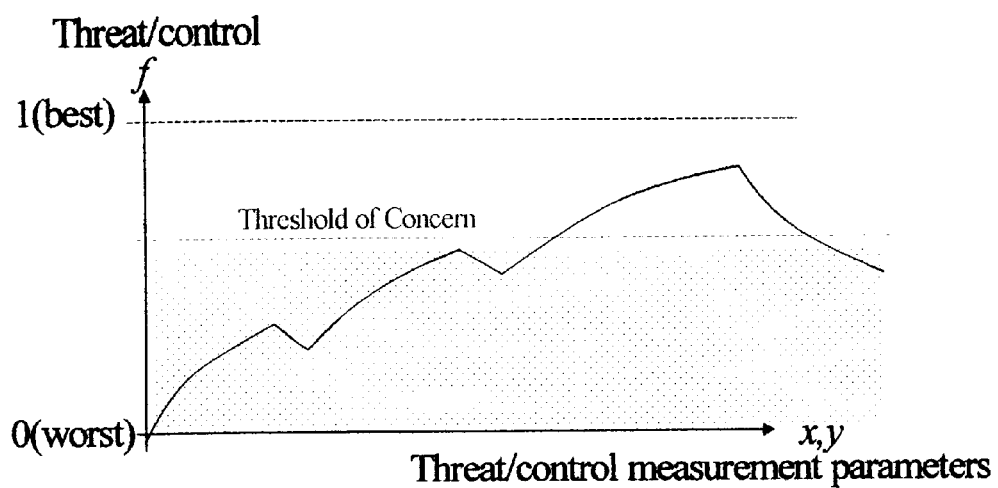
FIG. 9 shows the results of soft aggregation.

The output of a processing step according to equation 3 is shown in FIG. 9. The effects of three positive factors (control) increase the value of $f$ towards 1, and three negative factors (threat) decrease the value towards 0.

Of course, other formulae to $f$ calculated may be used in the practice of the invention, as long as they generate non-linear values that are indicative of 'perfectly positive' (such as '1') and 'perfectly negative' (such as '0') in an asymptotic manner. For example, other constants could be used in place of e, and the exponents for these constants could be functions of either the positive or negative inputs.

The implementation strategy for the systems shown in from FIGS. 3 to 8 should now be apparent. The inputs to each box are the data representative of the system under study; which in the figure is safety of an airline. Factors which contribute negatively to safety (the 'y' in equation 3) are illustrated as entering the box through circles; positive factors have no circles. The weights for each factor are shown as the line enters the box; the weights for each of the positive and negative factors summing to 1 as discussed above. Each box applies the given inputs and weights to equation 3.

EXAMPLE 2

Application of Soft Aggregation

Figure 6:
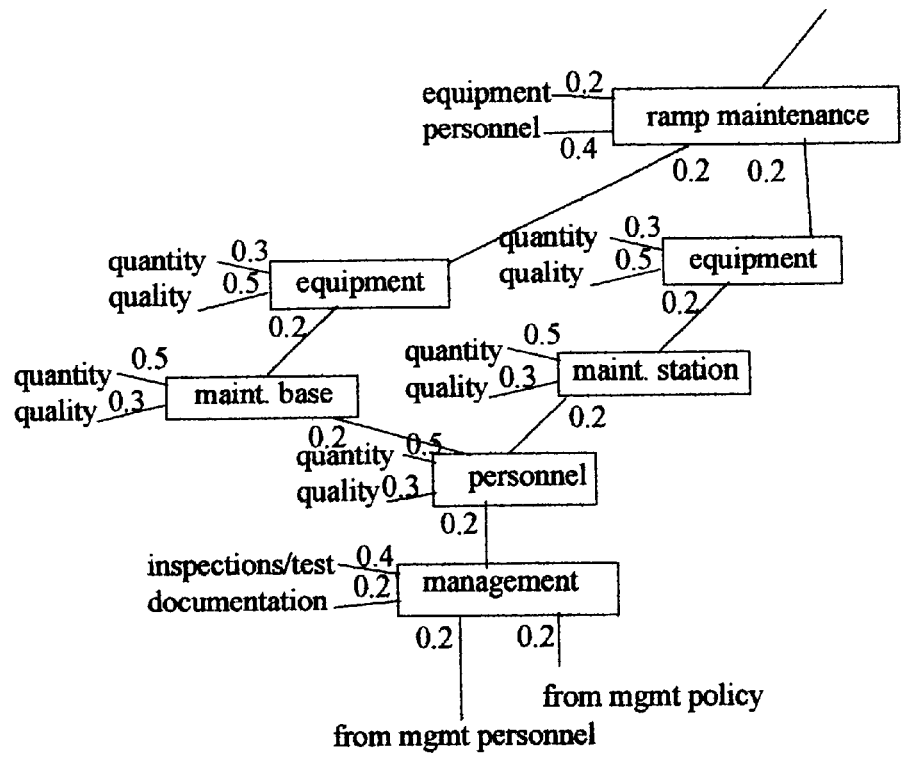
FIG. 6 shows a maintenance subsystem of the system of FIG. 4.
Figure 7:
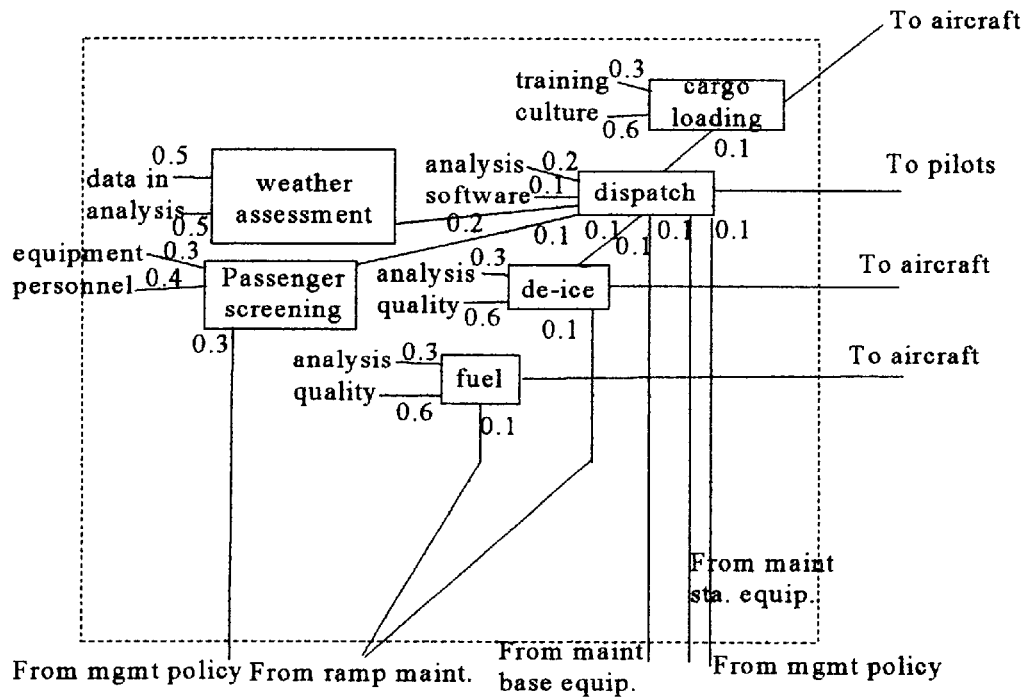
FIG. 7 shows a pre-flight operations subsystem of the system of FIG. 4.
Figure 8:
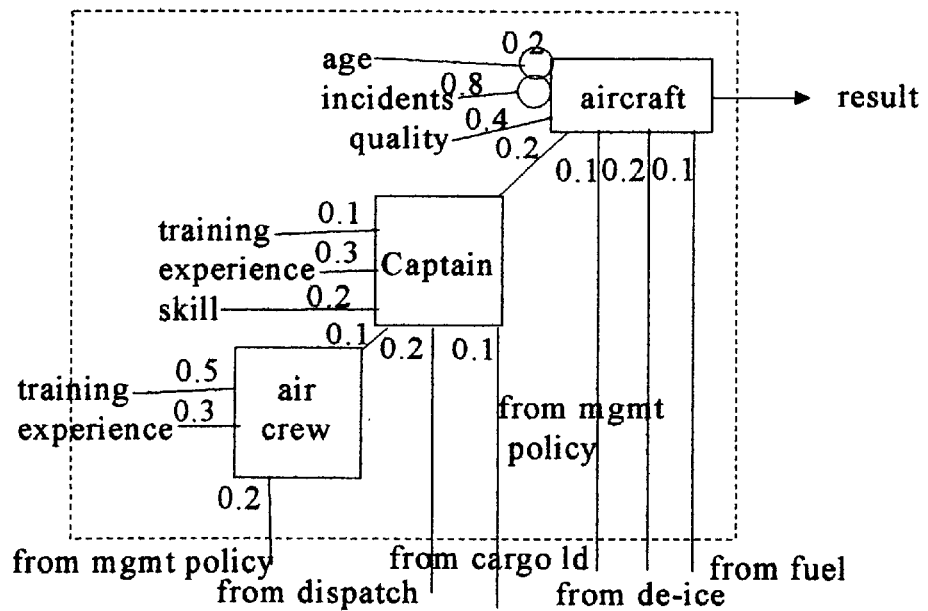
FIG. 8 shows an in-flight operations subsystem of the system of FIG. 4.

The following example shows the calculations for the second level embodiment of FIG. 6. The teachings of this example are easily applied to each of the first level and third level embodiments.

| | |
|---|---|
| Airline Management Subsystem | Safety Culture = $x_1$ (system constant: $w_1 = 0.5$) <br> Compliance = $x_2(w_2 = 0.1)$ <br> Policy = $x_3(w_3 = 0.2)$ <br> Training = $x_4(w_4 = 0.2)$ <br> Incidents = $y_1(v_1 = 1.0)$ <br> Subsystem Result: $x_5 =$ <br> $(1 - e^{-2(w_1x_1+w_2x_2+w_3x_3+w_4x_4)})e^{-2v_1y_1}$ |
| Maintenance Subsystem | $x_5$ solved for above ($w_{5,1} = 0.3$) <br> Inspections and Test = $x_6(w_6 = 0.2)$ <br> Facilities and Equipment = $x_7(w_7 = 0.2)$ <br> Documentation = $x_8(w_8 = 0.1)$ <br> Training = $x_9(w_9 = 0.2)$ <br> Subsystem Result: $x_{10} = 1 - e^{-2(w_{5,1}x_5+w_6x_6+w_7x_7+w_8x_8+w_9x_9)}$ |
| Pre Flight Operations Subsystem | $x_5$ solved for above ($w_{5,2} = 0.2$) <br> Safety Programs = $x_{11}(w_{11} = 0.3)$ <br> Dispatch Decision Machinery = $x_{12}(w_{12} = 0.5)$ <br> Subsystem Result: $x_{13} =$ <br> $1 - e^{-2(w_{5,2}x_5+w_{11}x_{11}+w_{12}x_{12})}$ |
| In-Flight Operations Subsystem | $x_5$ solved for above ($w_{5,3} = 0.1$) <br> $x_{10}$ solved for above ($w_{10} = 0.2$) <br> $x_{13}$ solved for above ($w_{13} = 0.1$) <br> Crew Experience = $x_{14}(w_{14} = 0.2)$ <br> Cargo Loading = $x_{15}(w_{15} = 0.1)$ <br> Aircraft Equipment = $x_{16}(w_{16} = 0.1)$ <br> Training = $x_{17}(w_{17} = 0.2)$ <br> Subsystem (and Final) Result: $1 - e^{-2(w_{5,3}x_5+w_{10}x_{10}+w_{13}x_{13}+w_{14}x_{14}+w_{15}x_{15}+w_{16}x_{16}+w_{17}x_{17})}$ |

The preferred embodiment for implementation is its a programmed computer. The programming required for this implementation, based on the teachings of the invention, is routine for one of ordinary skill in the art.

Dependence

Dependence among inputs requires special treatment. Soft aggregation, by its exponential nature, inherently includes some implicit dependence. For example, two like-contributing inputs that would add linearly in another system will add to less than their linear sum under soft aggregation. But beyond this, there are inputs that can be readily identified as being explicitly dependent. For example, culture and training are separate, but generally related. For this reason, the user of the latent effects methodology may signify a measure of dependence for a specified group of inputs. This measure ranges from d=0 (complete independence) to 1 (complete dependence). The result is that groups of dependent controls do not contribute as much to safety status as if they were independent. This is described in equation 5, where the effect is essentially to place the result a fraction d of the way from the exponential weighted sum that would result if the inputs were dependent and the least desirable of the inputs taken individually:

$$f_d = \left(1 - e^{-\frac{1}{k}[(w_ix_i)_{min} + \{\sum_{i=1}^n w_ix_i - (w_ix_i)_{min}\}(1-d)]}\right) \times e^{-\frac{1}{k}[(v_jy_j)_{max} + \{\sum_{j=1}^m v_jy_j - (v_jy_j)_{max}\}(1-d)]} \quad 4$$

Here, the summation limits range over the inputs in the dependent set, tending toward the most conservative assessment. In this manner, the equation can be applied to as many groups as desired.

Importance and Sensitivity

In addition to the information provided by the system outputs, information about the inputs is valuable. Two useful measures are: Importance (amount of contribution to the output) and Sensitivity (amount of change in the output that a change in the input could make if improved. To determine the Importance of controls (positive inputs), the difference between the weighted contribution of each input and the weighted contribution if the input=1 is generated for each input to derive the amount of contribution, and for Sensitivity of controls, the difference between the weighted contribution of each input and the weighted contribution if the input=0 is generated by each input is used to derive the amount of potential for improvement. For Importance of hazards, the difference between the weighted contribution of each input and the weighted contribution if the input=0 is generated for each input to derive the amount of contribution, and for Sensitivity of hazards, the difference between the weighted contribution of each input and the weighted contribution if the input=1 is used to derive the amount of potential for improvement.

Using the data from the previous example, the following example illustrates these features:

EXAMPLE 3

Importance and Sensitivity

| | |
|---|---|
| Importance Measures: | Mgmt Safety Culture: <br> $0.5x_1(0.3 * 0.2 + 0.2 * 0.1 + 0.1) = 0.09x_1$ <br> Management Compliance: $0.1x_2(0.18) = 0.018x_2$ <br> Management Policy: $0.2x_3(0.18) = 0.036x_3$ <br> Management Training: $0.2x_4(0.18) = 0.036x_4$ <br> Management Incidents: $(1 - y_1)(0.18)$ <br> Maintenance Inspections and Test: $0.2x_6(0.2) = 0.04x_6$ <br> Maintenance Facilities and Equip: $0.2x_7(0.2) = 0.04x_7$ <br> Maintenance Documentation: $0.1x_8(0.2) = 0.02x_8$ <br> Maintenance Training: $0.2x_9(0.2) = 0.04x_9$ <br> Pre-Flight Ops Safety Programs: $0.3x_{11}(0.1) = 0.03x_{11}$ <br> Pre-Flight Ops Dispatch Decision: $0.5x_{12}(0.1) = 0.05x_{12}$ <br> In-Flight Operations Crew Experience: $0.2x_{14}$ <br> In-Flight Operations Cargo Loading: $0.1x_{15}$ <br> In-Flight Operations Equipment: $0.1x_{16}$ <br> In-Flight Operations Training: $0.2x_{17}$ |
| Sensitivity Measures: | Management Safety Culture: $0.5(1 - x_1)(0.18)$ <br> Management Compliance: $0.1(1 - x_2)(0.18)$ <br> Management Policy: $0.2(1 - x_3)(0.18)$ <br> Management Training: $0.2(1 - x_4)(0.18)$ <br> Management Incidents: $0.18y_1$ <br> Maintenance Inspections and Test: $0.2(1 - x_6)(0.2)$ <br> Maintenance Facilities and Equipment: $0.2(1 - x_7)(0.2)$ <br> Maintenance Documentation: $0.1(1 - x_8)(0.2)$ <br> Maintenance Training: $0.2(1 - x_9)(0.2)$ <br> Pre-Flight Operations Safety Programs: $0.3(1 - x_{11})(0.1)$ <br> Pre-Flight Ops Dispatch Decision: $0.5(1 - x_{12})(0.1)$ <br> In-Flight Operations Crew Experience: $0.2(1 - x_{14})$ <br> In-Flight Operations Cargo Loading: $0.1(1 - x_{15})$ |

-continued

In-Flight Operations Equipment: $0.1(1 - x_{16})$
In-Flight Operations Training: $0.2(1 - x_{17})$

Threshold of Concern

Scorekeepers frequently delude themselves into thinking thresholds of concern, such as probabilistic safety requirements or grades as a measure of a school's ability to teach, are firm, whereas their source is not firm. For example, if there is a requirement that a system must maintain safety from catastrophic failure to a probability of one in a million, the implication is that an analysis that derived a system safety measure of 0.9999989 would be indicative of an unsatisfactory system (does not meet the requirement) and an analysis that derived a system safety measure of 0.999999 would be indicative of a satisfactory system (meets the requirement). Common sense indicates there is a trivial difference between these two values.

Figure 11:
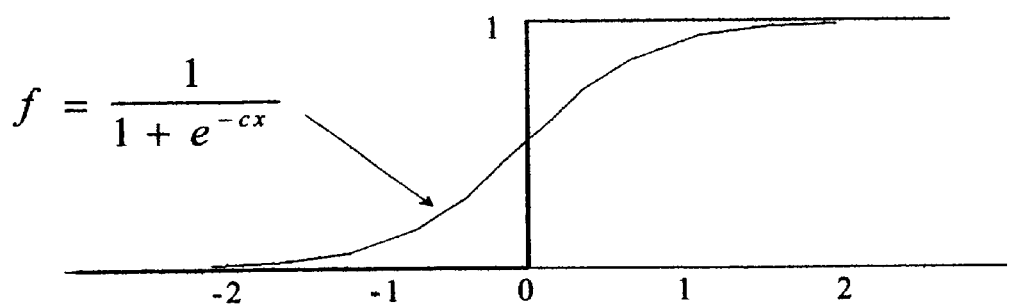
FIG. 11 shows threshold logic as utilized in the invention.

In order to more realistically portray the comparison of information aggregation with a threshold of concern, the invention includes a non-abrupt transition, as indicated in FIG. 9 by the threshold. In actuality, the threshold should be gradual, and the invention accomplishes this through use of a "sigmoid," an exponential function that transitions gradually from zero to one as an abscissa value x increases through zero, with a transition rate determined by a constant, c. FIG. 11 shows an application of this idea to "threshold logic," where weighted sums are compared to a threshold to realize a Boolean function. The transition constant shown is c=1.5.

In the system, an analog indicator will indicate "0" when the value is well below the threshold, indicate "1" when the value is well above the threshold, and indicate a transition value between 0 and 1 when the value is intermediate. The observer of the system thus has clear indication of the state of the system; there is no uncertainty about "did it just switch"?

Display

Figure 10:
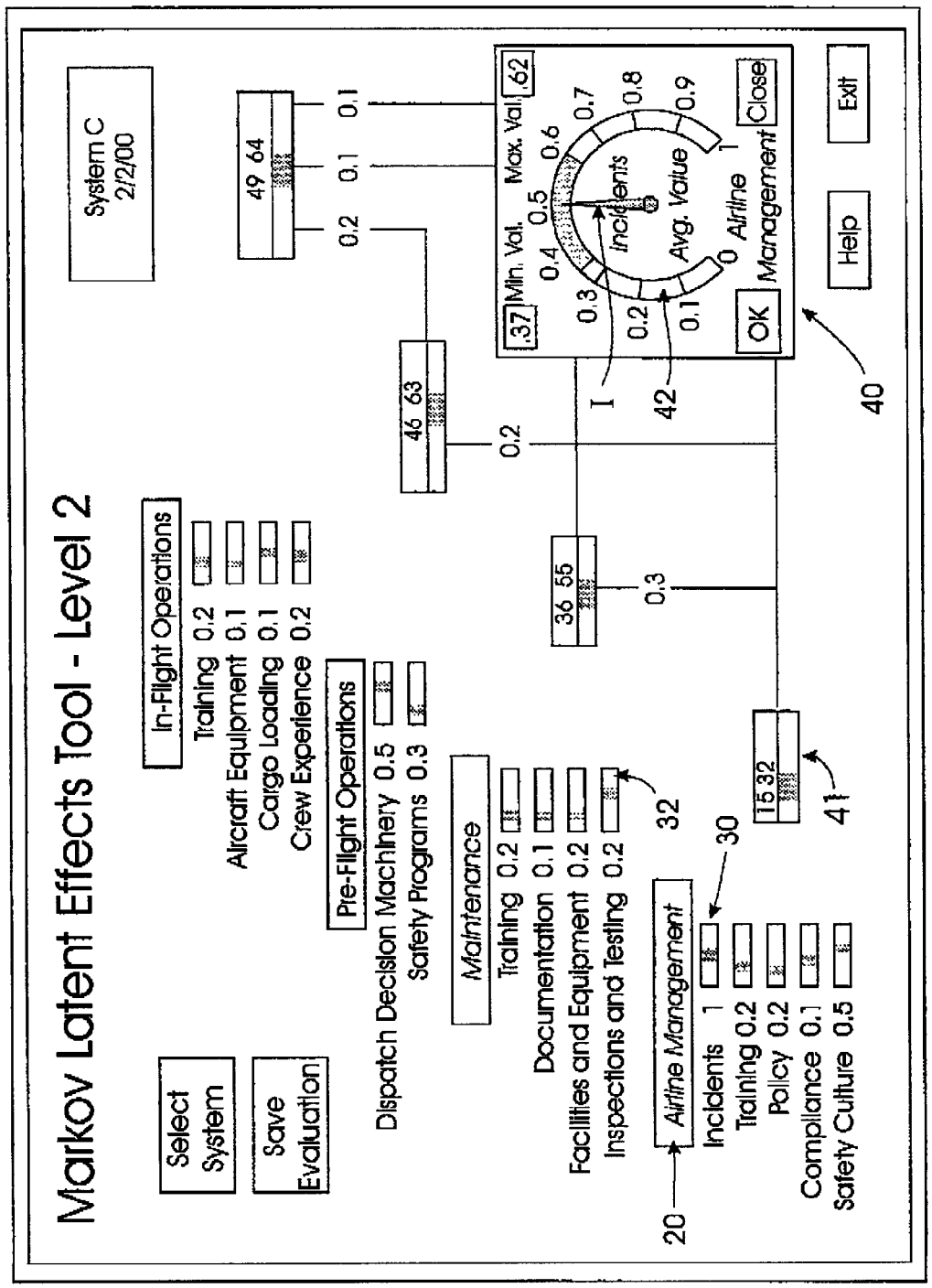
FIG. 10 shows a computer-screen display of the invention.

It should be apparent that the inputs to be utilized in this invention are not usually definite, known, numbers. For the subjective factors that provide inputs to the typical system analyzed by the invention, the prudent user would want to enter a range of inputs extending from a highest value to a lowest value, and the resulting output would also cover a range. The computer-screen display 10 of this invention is shown in FIG. 10 to include a touch-screen representation of the latent-effects model of FIG. 6. Each of the components, such as Airline Management 20, has its inputs indicated along with the relative weight assigned to each input (training is 0.2). Each input is indicated by a bar indicator 30 that has a colored bar 32 which indicates the high and low values of the range of entered data.

Each input may be accessed by clicking a mouse or other pointer on the bar. Gauge 40 shows the display that results when the 'Incidents' input to Airline Management 20 is accessed. Gauge 40 has a continuous dial 42 extending from the lowest possible value (such as '0') to the highest possible input value (such as '1'). The lower value of the input range is selected by clicking on the gauge at the appropriate lower value (such as 0.37), and the higher value is selected by clicking at the appropriate higher value (such as 0.62). This range is indicated on the dial by a different color, and the high and low values are also indicated digitally. Alternatively, the range may be entered digitally. The gauge needle points to the average value.

The output of each component is indicated by another bar 41, which bar also displays digitally a lower value (such as 0.15) calculated using equation 3 with the low values of the component inputs, and a higher value (such as 0.32) calculated using the high values of the component inputs.

As disclosed, display 10 is quite conventional, and may take many forms. For example scale 42 may be curved, as shown, or linear, or any other shape that extends between low and high points. It is shown as an analog scale with an indicator I that moves. Alternatively, scale 42 could be represented by a line of lights, whereby the range between low and high values is indicated by illuminated lights. The range could also indicate which portion of the range is most likely to occur. Any other form of indicator that provides the information discussed herein is contemplated for use in this invention Another capability of the display methodology is to turn on "warning" or "early alert" indicator lights (preferably implemented on a computer screen) in response to soft aggregation of information. The nature of the soft aggregation enables the indicators to turn on gradually as a threshold of interest is approached.

Early Alert Logic

Early alert or warning logic can be based on comparing any of the inputs or outputs to a threshold, or by constructing special logic equations. For example, if the output of one of the components were below a predetermined level, then a warning light would provide the user an indication of a problem. Such indicators preferably may be implemented as a gradual warning indicator turn-on using threshold logic as set forth above.

Trends

Static assessments need to be supplemented by multiple assessments over time, from which trends can be derived. The latent effects methodology provides trends information in several ways. The inputs can be stored in a database, so that historic information can be plotted to show trends over time. The process is also used both for the overall result output, and for each subsystem output.

Figure 12:
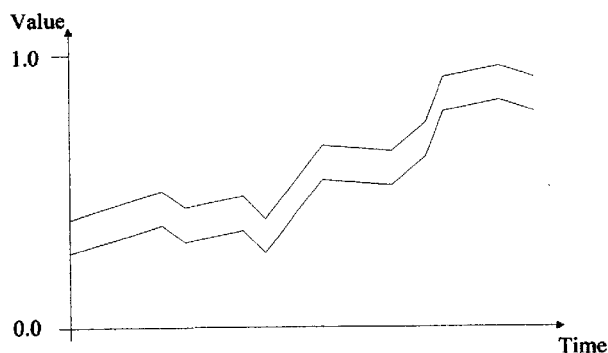
FIG. 12 shows a sample trends plot with uncertainty.

An example trends plot is shown in FIG. 12, where the quantitative representation of a particular input (or output) is tracked over a period of time, during which multiple assessments are made. As is typical of such plots, there is some cyclic response and "noise" on the plot as trends develop, which can be filtered. Also indicated (by the vertical spread) is the uncertainty due to subjectively derived evaluations.

EXAMPLE 4

Trends

Figure 13:
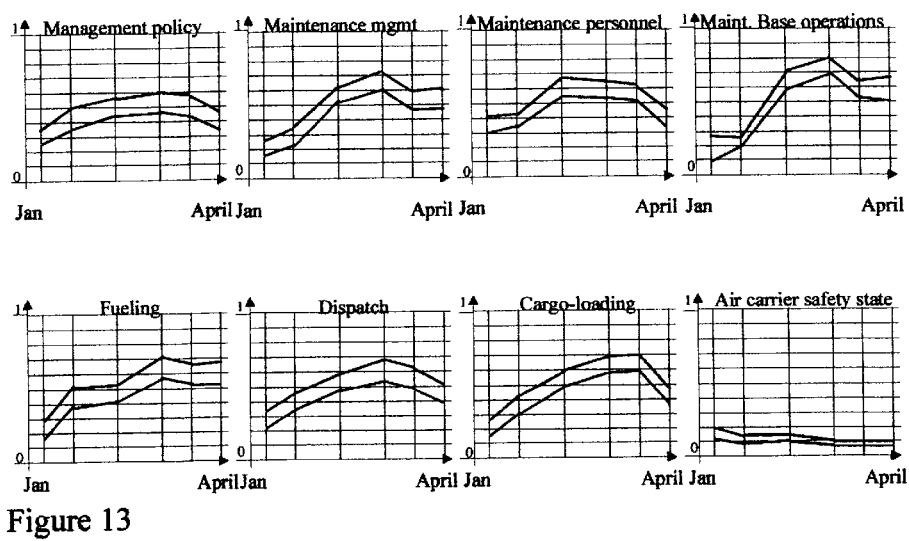
FIG. 13 shows selected trend outputs for Example 2.

In order to understand how the tool of this invention may be utilized, this example examines hypothetical results from data applied to the system of FIG. 3, which shows the architecture used, including the breakdown as described above of an air safety system into four subsystem areas. The 20 modules that are derived from these four subsystems and the main interconnection influences are also shown. The figure does not show the particular inputs for each of the modules, the weights, the dependence groups, or the early alerts The process simulated for this test case used 500–800 data items over a several month period and aggregated information needed for the 45 latent effect inputs. As the computation is carried out, it also produces information about the effects of the various inputs. Although there are 20 module outputs computed at various times over the period represented, a representative selection of eight of the 20 module outputs have been chosen to display trends histories in FIG. 13. The upper curve of each diagram represent the "good" bound for the results; the lower bounds represent the "bad" side. Because of the mathematical structure used, the minimum result is caused by minimum contributions for each positive input and maximum contributions for each negative input; while the maximum result is caused by the maximum contribution for each positive input and the minimum contribution for each negative input. This is how uncertainty ranges for inputs are converted to uncertainty ranges for outputs.

The "Air Carrier Safety Status" is like an overall grade for the airline as a function of time and uncertainty and represents the output at the upper right corner of FIG. 3.

Some questions naturally arise when the output data are examined. Examples are listed below. Also included are pointers to what path needs to be followed to answer the questions. Then more detail is offered.

Q 1: Why is the overall aircraft safety score so low, and why is it declining?

A 1: Sensitivity points most strongly at aircraft incidents (most predominant, but among other factors). This suggests that the aircraft incidents aggregation process must be examined.

Q 2: What contributed to the maintenance-base early-year improvement, and should we worry about the recent decline?

A 2: The importance measure points mainly to maintenance base quality (again, there are others of somewhat lesser significance). This points to the maintenance base quality aggregation process.

Q 3: What contributed to the cargo-loading early-year improvement, and is the recent decline a concern?

A 3: The importance measure points mainly to maintenance base quality (among others).

Q 4: Why are management policy and maintenance management declining?

A 4: The sensitivity measure points mainly to management culture (and to others). So look at the management culture aggregation process.

Figure 14:
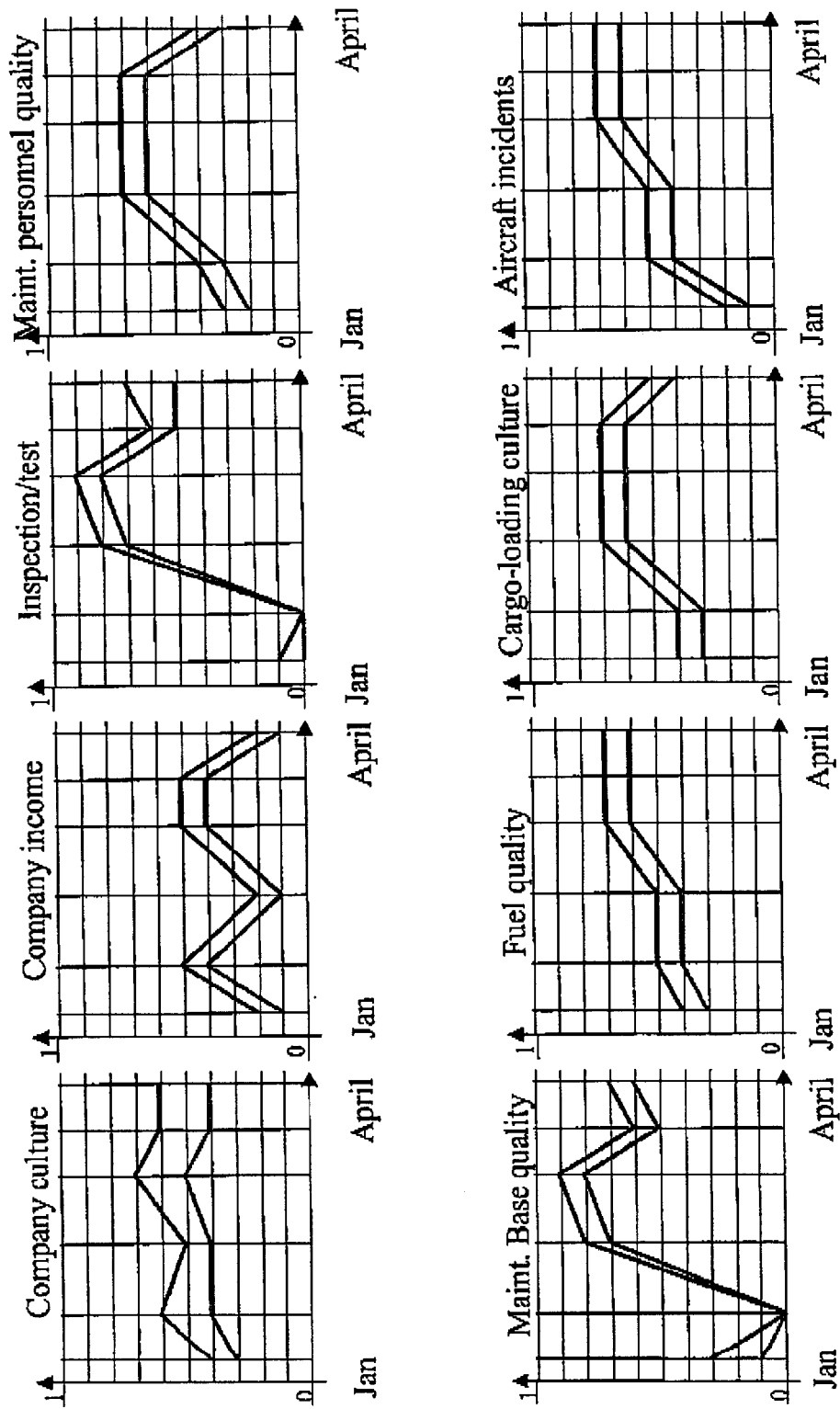
FIG. 14 shows trend plots for example latent effects tool inputs.

In order to pursue answers to questions such as these, the inputs can be examined. In FIG. 14, trends histories for eight of the 45 Latent Effects Tool inputs are shown, as an example selection. Some inputs are "negative, " meaning that fulfillment of the descriptor indicated is "bad" rather than "good." An example is "Aircraft incidents" at the right of the Figure. For these, the upper bound is bad and the lower bound is good, rather than the inverse that appears for positive inputs. (In the actual display, good and bad are easily represented by different colors.)

Now, a new set of questions arises about the Latent Effects Tool inputs. Some examples are shown below:

Q 5: What caused the improvement in inspection/test and maintenance base quality during the period examined?

A 5: This trend pattern correlates with maintenance personnel quality improvement, which in turn points to (see input aggregation) the importance of morale and turnover of personnel and maintenance training. However, the downturn in maintenance personnel quality noted in April should be a warning flag to watch for possible subsequent ripples into inspection/test and maintenance base quality.

Q 6: Why is fuel quality improving?

A 6: First look at the input aggregation (to be described subsequently). From this, it can be seen that testing and fuel handling have high importance and sensitivity, and improvement in these correlates with fuel quality improvement.

Q 7: Why are aircraft incidents increasing?

A 7: Again, look at the input aggregation. Using importance and sensitivity as a guide, note a string of major component failures, and this correlates with earlier (latent effects) maintenance problems.

In setting up the test example, two early alert logic equations were entered. The alert in FIG. 15A shows aircraft preparation, and the alert in FIG. 15B shows management influence. The alerts are constructed so that the upper part of the graph (especially above 0.5) flags a concern, and so that there is not a hard-over switch from no concern to concern, which would detract from the potential for human interpretation. The effect of filtering is also shown (by the dashed lines) in order to demonstrate how filtered results smooth some of the "noise" out of the trends plots. If these results controlled warning, the filtering would suppress the tendency of the indicators to go on and off due to uncertainty rather than due to change in situation.

Those skilled in this art will readily recognize that the information provided by the invention may be combined in many ways to provide other decision aids and indicators for use in determining the performance of a system.

Conclusion

These examples show the utility of this invention; if the proper data is tracked, the invention provides outputs which help the performance of the system to be readily monitored in order that corrective action may be timely taken in order to avoid future problems.

The particular sizes and equipment discussed above are cited merely to illustrate a particular embodiment of this invention. It is contemplated that the use of the invention may involve components having different sizes and shapes as long as the principle, latent effects architecture, soft aggregation accumulation, and gage-like input/output displays, is followed. For example, we have applied the structure to problems in weapons assessment, aviation safety and water resource management. It is intended that the scope of the invention be defined by the claims appended hereto.

We claim:

1. A computer implemented method of utilizing latent effects of prior events in making decisions about a system having an output indicative of the state of the system, said method comprising:

decomposing the system into a series of subsystems, each of said subsystems having at least one input and an output, the outputs of all but one subsystems forming inputs for subsequent subsystems, the output of the last subsystem in the series being the system output;

arranging said subsystems in time order according to the immediacy with which a change in an output of a subsystem causes a change in the system output, the subsystems earlier in time order providing information representative of latent effects;

in series order starting with the subsystem furthest in time from the system output, using a computer to apply a non-linear function that asymptotically approaches each of a first value as the value of positive inputs increase and a second lower value as the value of negative inputs increase to determine the output for that subsystem.

2. The method of claim 1 further comprising decomposing any subsystem into a series of additional subsystems.

3. The method of claim 2 wherein each of the inputs are weighted.

4. The method of claim 3 wherein the sum of the weights of the positive inputs and the sum of the weights of the negative inputs each equal one.

5. The method of claim 4 wherein each output $$f = [1 - a^{-f(q)}] \cdot b^{-f(r)},$$

where a and b are constants, $f(q)$ is a function of one of the positive negative inputs, and $f(r)$ is a function of the other of the positive or negative inputs.

6. The method of claim 5 wherein $$f = \left[1 - e^{-\sum_{i=1}^{n} k_g w_i x_i}\right] e^{-\sum_{j=1}^{m} k_b v_j y_j}$$

where $w_i$ and $v_j$ are "weights" on the significance of the n "positive" and m "negative" factors being; $x_i$ are the positive inputs and $y_j$ are the negative inputs on a scale of 0 to 1; and the constants $k_g$ and $k_b$ are variables that controls how fast positive and negative information accumulates.

7. The method of claim 6 wherein $$\sum_{i=1}^{n} w_i = 1 \text{ and } \sum_{j=1}^{m} v_j = 1.$$

8. The method of claim 6 wherein each input covers a range extending from a highest value to a lowest value, and each output is displayed as a range having a low value determined from the lowest values of inputs and a highest value determined from the highest values of inputs.

9. The method of claim 8 wherein said inputs and outputs are represented on a computer display.

10. The method of claim 6 further comprising enabling a warning indicator when a determined output exceeds a predetermined value.

11. The method of clam 10 wherein said warning indicator provides a first indication when said predetermined output is a predetermined amount below said predetermined value, a second indication when said predetermined output is approximately at said predetermined value, and a third indication when said predetermined output is a predetermined amount above said predetermined value.

12. The method of claim 3 wherein the system output is representative of a quantifiable measure of an attribute of a system.

13. The method of claim 12 further comprising using the computer implemented method to model historical data for a system, and adjusting the weights to give an output corresponding to the historical data.

14. A computer implemented method of utilizing latent effects of prior events in making decisions about a system having an output indicative of the state of the system, said method comprising:

decomposing the system into a series of subsystems, each of said subsystems having at least one input and an output, the outputs of all but one subsystems forming inputs for subsequent subsystems, the output of the last subsystem in the series being the system output;

further decomposing any subsystem into a series of subsystems;

arranging said subsystems in time order according to the immediacy with which a change in an output of a subsystem causes a change in the system output, the subsystems earlier in time order providing information representative of latent effects; and in series order stating with the subsystem furthest in time from the system output, using a computer to apply a weighted non-linear function that asymptotically approaches each of a first value as the value of positive inputs increase and a second lower value as the value of negative inputs increase to determine the output for that subsystem, where the sum of the weights of the positive inputs and the sum of the weights of negative inputs each equal one and each output $$f = [1 - a^{-f(q)}] \cdot b^{-f(r)},$$

where a and b am constants, $f(q)$ is a function of one of the positive negative inputs, and $f(r)$ is a function of the other of the positive or negative inputs.

* * * * *